(12) United States Patent
Wall et al.

(10) Patent No.: US 9,627,002 B2
(45) Date of Patent: *Apr. 18, 2017

(54) EDITING DIGITAL FILM

(71) Applicants: Angus Wall, Santa Monica, CA (US); Andreas Wacker, Los Angeles, CA (US)

(72) Inventors: Angus Wall, Santa Monica, CA (US); Andreas Wacker, Los Angeles, CA (US)

(73) Assignee: Black Mariah, Inc., Santa Monica, CA (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/911,211

(22) Filed: Jun. 6, 2013

(65) Prior Publication Data

US 2013/0266291 A1    Oct. 10, 2013

Related U.S. Application Data

(63) Continuation of application No. 11/970,421, filed on Jan. 7, 2008, now Pat. No. 8,463,109.

(51) Int. Cl.
   *G11B 27/28*  (2006.01)
   *G11B 27/22*  (2006.01)
   (Continued)

(52) U.S. Cl.
   CPC ....... *G11B 27/034* (2013.01); *G06F 17/30017* (2013.01); *G11B 27/028* (2013.01); *G11B 27/031* (2013.01)

(58) Field of Classification Search
   CPC . G11B 27/031; G11B 27/028; G06F 17/30017
   (Continued)

(56) References Cited

U.S. PATENT DOCUMENTS 5,157,779 A  * 10/1992  Washburn et al. ............. 714/37
5,247,524 A     9/1993  Callon
(Continued)

FOREIGN PATENT DOCUMENTS

WO       WO 99/66728       12/1999

OTHER PUBLICATIONS

International Search Report from PCT/US2008/050516, completed on Sep. 5, 2008 by the Korean Intellectual Property Office.
(Continued)

*Primary Examiner* — Alexander Lagor
(74) *Attorney, Agent, or Firm* — Greenberg Traurig, LLP

(57) ABSTRACT

An apparatus and method for editing digital picture computer files and digital audio computer files is disclosed herein. The apparatus and method for editing involves recording digital picture files and digital audio files. The digital picture files are copied onto a storage area network, and loaded onto a data storage system. Metadata from the digital picture files is uploaded onto a metadata database. The digital picture files on the storage area network are compressed. The compressed digital picture files are combined and synchronized with their corresponding digital audio files. These resultant digital files are then organized with their corresponding metadata. Once the metadata is incorporated into the resultant digital files, the files are edited and an editing decision list document as well as editing instructions are generated. Digital picture files are downloaded from the data storage system and conformed with digital audio files to produce the final media product.

16 Claims, 2 Drawing Sheets

(51) Int. Cl.
*G11B 27/034* (2006.01)
*G11B 27/028* (2006.01)
*G06F 17/30* (2006.01)
*G11B 27/031* (2006.01)

(58) Field of Classification Search
USPC .................. 386/278, 239–262, 279–290
See application file for complete search history.

(56) References Cited

U.S. PATENT DOCUMENTS

| | | | |
|---|---|---|---|
| 5,307,456 A | 4/1994 | MacKay | |
| 5,355,450 A | 10/1994 | Garmon | |
| 5,493,649 A | 2/1996 | Slivka et al. | |
| 5,568,275 A | 10/1996 | Norton et al. | |
| 5,583,496 A | 12/1996 | Sharpe, III et al. | |
| 5,754,851 A | 5/1998 | Wissner | |
| 5,812,216 A | 9/1998 | Peters et al. | |
| 5,841,512 A | 11/1998 | Goodhill | |
| 5,870,471 A | 2/1999 | Wootton et al. | |
| 5,905,841 A | 5/1999 | Peters et al. | |
| 6,016,380 A | 1/2000 | Norton | |
| 6,061,758 A | 5/2000 | Reber et al. | |
| 6,094,722 A | 7/2000 | Astola et al. | |
| 6,101,620 A | 8/2000 | Ranganathan | |
| 6,161,115 A | 12/2000 | Ohanian | |
| 6,372,974 B1* | 4/2002 | Gross et al. .................. 84/609 |
| 6,381,608 B1 | 4/2002 | Savoie | |
| 6,418,223 B1 | 7/2002 | Wootton et al. | |
| 6,735,776 B1 | 5/2004 | Legate | |
| 6,829,017 B2 | 12/2004 | Phillips | |
| 6,851,051 B1 | 2/2005 | Bolle et al. | |
| 6,871,003 B1 | 3/2005 | Phillips et al. | |
| 7,002,710 B1 | 2/2006 | Van Liew et al. | |
| 7,003,178 B2 | 2/2006 | Pettigrew et al. | |
| 7,023,924 B1 | 4/2006 | Keller et al. | |
| 7,251,343 B2 | 7/2007 | Dorrell et al. | |
| 7,328,458 B2 | 2/2008 | Yamanaka et al. | |
| 7,346,054 B2 | 3/2008 | Chen et al. | |
| 7,412,153 B2 | 8/2008 | Kawahara et al. | |
| 2001/0031128 A1* | 10/2001 | Manbeck ............ G11B 27/032 386/279 |
| 2002/0001395 A1 | 1/2002 | Davis et al. | |
| 2002/0103701 A1 | 8/2002 | Mowry | |
| 2002/0146232 A1 | 10/2002 | Harradine et al. | |
| 2003/0212762 A1 | 11/2003 | Barnes et al. | |
| 2004/0126085 A1 | 7/2004 | Braun et al. | |
| 2004/0236748 A1 | 11/2004 | Coltrera | |
| 2005/0165840 A1 | 7/2005 | Pratt et al. | |
| 2005/0165844 A1 | 7/2005 | Yanagita et al. | |
| 2005/0177466 A1 | 8/2005 | Willins | |
| 2005/0244148 A1 | 11/2005 | Tsumagari et al. | |
| 2005/0254776 A1* | 11/2005 | Morrison ............... H04N 5/77 386/231 |
| 2005/0281534 A1 | 12/2005 | McKay | |
| 2006/0171584 A1 | 8/2006 | Sandrew | |
| 2006/0233529 A1 | 10/2006 | Moriya et al. | |
| 2006/0259903 A1 | 11/2006 | Vernon | |
| 2007/0046688 A1 | 3/2007 | Gonsalves et al. | |
| 2007/0098256 A1 | 5/2007 | Kulkarni et al. | |
| 2007/0147654 A1 | 6/2007 | Clatworthy et al. | |
| 2007/0153080 A1 | 7/2007 | Oehlbeck et al. | |
| 2007/0177718 A1 | 8/2007 | Shimosato et al. | |
| 2007/0183741 A1* | 8/2007 | Lerman et al. .................. 386/54 |
| 2007/0198746 A1 | 8/2007 | Myllyla et al. | |
| 2007/0222865 A1 | 9/2007 | Levien et al. | |
| 2007/0226507 A1 | 9/2007 | Schilling | |
| 2007/0242137 A1 | 10/2007 | McKain et al. | |
| 2008/0129826 A1 | 6/2008 | Musunuri et al. | |
| 2008/0273747 A1 | 11/2008 | Rhoads | |

OTHER PUBLICATIONS

International Preliminary Report on Patentability for PCT/US2010/025285, issued on Aug. 30, 2011.

* cited by examiner

EDITING DIGITAL FILM

RELATED APPLICATION

This application is a continuation of U.S. Utility patent application Ser. No. 11/970,421, filed Jan. 7, 2008, the contents of which are incorporated by reference herein in its entirety.

BACKGROUND OF THE DISCLOSURE

The present disclosure relates to editing digital film. In particular, it relates to efficiently editing digital picture computer files and/or digital audio computer files.

SUMMARY OF THE DISCLOSURE

The present disclosure relates to an apparatus and method for editing digital picture computer files and/or digital audio computer files. The apparatus and method for editing involves recording digital picture files and digital audio files, and loading the recorded digital picture files and digital audio files onto at least one portable file transport device. Once the recorded digital picture files are loaded onto at least one portable file transport device, metadata from the digital picture files is uploaded to a metadata database.

In one embodiment, at least one user may log onto a film editing portal website through internet connections. Once the user is logged onto the film editing portal website, according to the level of access granted to the user, the user may access the metadata already loaded onto the metadata database and/or the user may load notes, instructions, and/or additional metadata onto the metadata database.

The digital picture files are copied from the at least one portable file transport device to a storage area network, as well as loaded from the at least one portable file transport device to a data storage system. The bits of the digital picture files copied onto the storage area network are then compared with the bits of the digital picture files loaded onto the data storage system. If the bits of the digital picture files copied onto the storage area network substantially match the bits of the digital picture files loaded onto the data storage system, the digital picture files loaded onto the at least one portable file transport devices are deleted.

Conversely, if the bits of the digital picture files copied onto the storage area network do not substantially match the bits of the digital picture files loaded onto the data storage system, an error message and/or flag is sent. After the error message and/or flag is sent, the digital picture files from the at least one portable file transport device are reloaded onto the data storage system.

After the digital picture files are reloaded onto the data storage system, the bits of the digital picture files copied onto the storage area network are compared with the bits of the digital picture files reloaded onto the data storage system. If the bits of the digital picture files copied onto the storage area network still do not substantially match with the bits of the digital picture files loaded onto the data storage system, the above-recited process is repeated until the bits of the digital picture files copied onto the storage area network do substantially match with the bits of the digital picture files loaded onto the data storage system.

Then, the digital picture files copied onto the storage area network are converted to compressed digital picture files. The recorded digital audio files are loaded from the at least one portable file transport device to the storage area network. Then, the compressed digital picture files are combined and synchronized with the digital audio files loaded onto the storage area network to generate compressed digital picture files with corresponding digital audio files. These files are then organized with the metadata loaded onto the metadata database to generate compressed digital picture files with corresponding digital audio files and metadata.

At this point, the compressed digital picture files with corresponding digital audio files and metadata are cut and organized to generate at least one editing decision list document and editing instructions. The at least one editing decision list document is converted to retrieval instructions. According to the retrieval instructions, digital picture files are retrieved from the data storage system. Finally, the retrieved digital picture files are conformed with their corresponding digital audio files according to the editing instructions to produce the final media product.

BRIEF DESCRIPTION OF THE DRAWINGS

These and other features, aspects, and advantages of the present disclosure will become better understood with regard to the following description, appended claims, and accompanying drawings where:

DETAILED DESCRIPTION

The methods and apparatus disclosed herein provide an efficient system for editing digital picture computer files and/or digital audio computer files. This system allows for the entire editorial process to be kept under the control of the editors with a minimum of staff and expensive equipment.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

Figure 1:
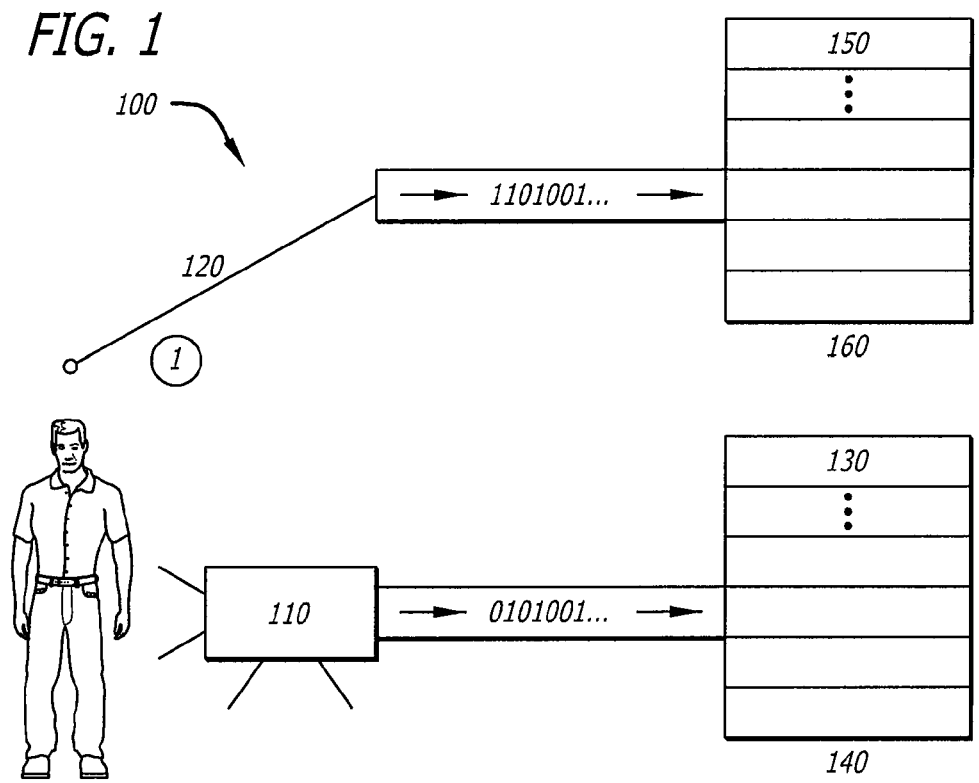
FIG. 1 is a schematic representation of digital picture files and digital audio files being recorded and stored at the location of the filming.

FIG. 1 illustrates digital picture computer files 130 and digital audio computer files 150 being recorded and stored at the location 100 of the shooting of the film. Step 1 of the disclosed system is depicted in FIG. 1. During Step 1, a digital film recorder 110 records digital picture files 130 while a digital microphone recorder 120 simultaneously records digital audio files 150. The digital picture files 130 are then transferred to at least one portable file transport device 140. Similarly, the digital audio files 150 are transferred to at least one portable file transport device 160. The two bit stream sequences in FIG. 1 depict the transferring of the digital files 130, 150 to their respective portable file transport devices 140, 160.

In one embodiment, the digital picture files 130 are uncompressed 4:4:4 full-range RGB DPX (digital motion picture exchange) files, and the digital audio files 150 are Aaton Cantar-X digital recorder audio files. However, other types of digital file formats, either compressed or uncompressed, may be utilized in this system. For example, the OpenEXR File Format, Tagged Image File Format (TIFF), Targa (Truevision Advanced Raster Graphics Adapter) File Format, JPEG (Joint Photographic Experts Group) File Format, and/or Cineon File Format may be used for the digital picture files 130. And, for the digital audio files, for example, the WAV (Waveform Audio Format) File Format or AIFF (Audio Interchange File Format) computer file formats may be used. In another embodiment, the digital picture files 130 consist of 3D (three dimensional) images.

In another embodiment, the digital film recorder 110 and the digital microphone recorder 120 may be combined into one electrical device. An example of a digital film recorder that may be utilized for this system is a Viper FilmStream 2K camera by Thomson Grass Valley. However, alternatively, other similar types of digital film recorders may be used. Similar types of digital film recorders include, but are not limited to, the ARRIFLEX D-20 camera by ARRI Group, the Red One camera by Red Digital Cinema Camera Company, the F23 camera by Sony, the HDW-F900 camera by Sony, the HDC-F950 camera by Sony, the Genesis camera by Panavision, and the Dalsa Origin camera by the Dalsa Corporation.

In another embodiment of the disclosed system, only digital picture files 130 are recorded at the location 100 of the filming. In yet another embodiment, only digital audio files 150 are recorded on the set 100.

In another embodiment, the digital picture files 130 and the digital audio files 150 are transferred to the same portable file transport device. In yet another embodiment, D.Mag (Digital Film Magazine) drives are used for the portable file transport devices 140, 160. However, other types of portable file transport devices may be used alternatively. Examples of other types of portable file transport devices that may be utilized include, but are not limited to, Compact Flash (CF) cards, Shuttle drives, Codex drives, Venom FlashPaks by Thomson Grass Valley, CD (Compact Disc) drives, and DVD (Digital Video Disk) drives.

In yet another embodiment, the portable file transport devices 140, 160 are not physically portable. In this embodiment, the file transport devices are stationary at a specific location. Additionally, in another embodiment, the digital picture files 130 and/or digital audio files 150 may be transferred via various types of electrical communication systems, which includes, but is not limited to, high speed internet connections, electrical hard-line wire connections, optical fiber connections, and/or wireless radio frequency (RF) connections.

Figure 2:
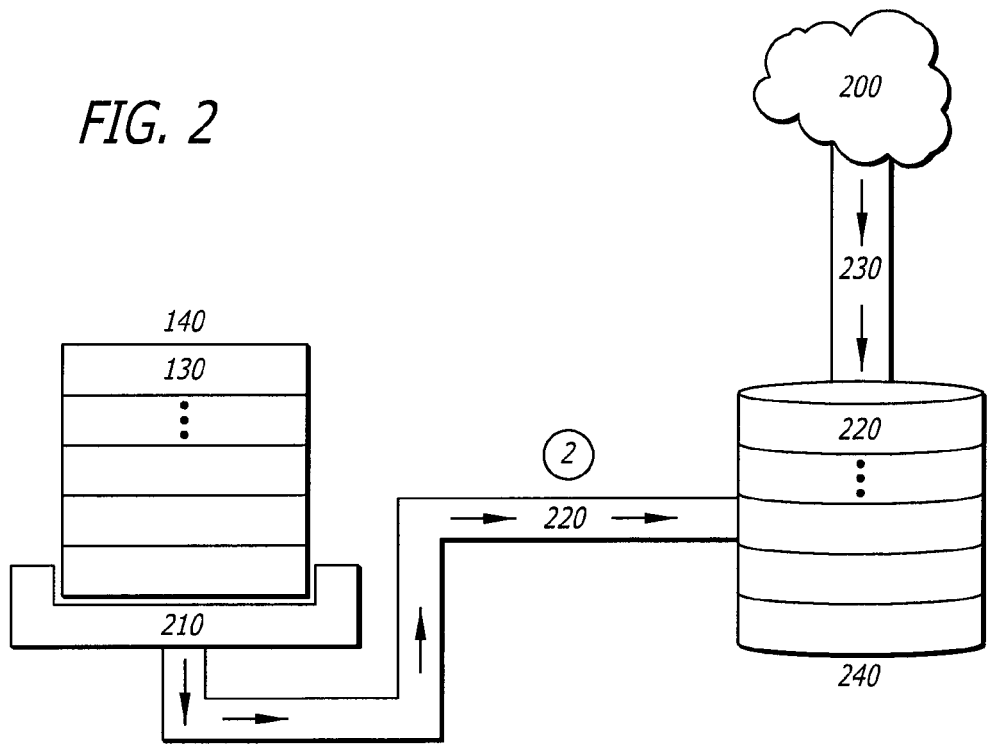
FIG. 2 illustrates a component diagram of a system for uploading metadata from the digital picture files onto a metadata database.

FIG. 2 is an illustration of metadata 220 from the digital picture files 130 being uploaded to a metadata database 240. Step 2 of the disclosed system is depicted in FIG. 2. During Step 2, the portable file transport device 140, which has the digital picture files 130 loaded onto it, is connected to a file transfer port 210. After the portable file transport device 140 is connected to the file transfer port 210, the metadata 220 that is contained in the digital picture files 130 is uploaded to a metadata database 240.

In one embodiment, the metadata 220 may consist of, but is not limited to, camera position data, which may be determined by the Global Positioning System (GPS); time of day; date; camera orientation and movement data; shutter angle data; exposure data; camera setting for sensitivity and other camera control settings; camera lens information; illumination information of artificial light sources; recording of ambient light; camera setup data; constellation data at the time of filming; temperature; witness camera video; and/or camera distance to subject measurements.

In another embodiment, a docking station is utilized as a file transfer port 210. However, other similar devices for transferring digital files can be used for the file transfer port 210. In another embodiment, the metadata database 240 is implemented by a MySQL database management system (DBMS) by MySQL. In yet another embodiment, Lookup Tables (LUTs) are stored in the metadata database 240 to retrieve at least one output data value that corresponds with at least one input data value. In this system, LUTs are used for, among other things, color correction of the picture images. However, there are various other types of databases as well as database search methods that may be used for the metadata database 240 of this system. Examples of other types of databases that may be utilized for the metadata database 240 include, but are not limited to, a DB2 database by IBM and an Oracle database by Oracle Corporation.

In another embodiment, users are able to access the metadata database 240 through the internet 200. In order for a user to access the metadata database 240, the user must first log onto a film editing portal website by using a password. Each user may have a unique password, some of the users may share the same password, or all of the users may share the same password. The password may comprise of text, which may include numbers and symbols; a digital signature; and/or biometrics, which may include the use of fingerprints, for identification of the user.

After a user has logged onto the film editing portal website, the user may either access the metadata 220 in the metadata database 240, and/or may load notes, instructions, and/or additional metadata 230 to the metadata database 240. Whether a user is able to access the metadata 220 in the metadata database 240, and/or load notes, instructions, and/or additional metadata 230 to the metadata database 240 is determined by the access level that is assigned to that particular user.

In one embodiment, the metadata database 240 resides on the storage area network 300. Alternatively, in another embodiment, the metadata database 240 is located on a server or computer device that is separate from the storage area network 300.

In yet another embodiment, users may either access the metadata 220 in the metadata database 240, or may load notes, instructions, and/or additional metadata 230 to the metadata database 240 by simply logging onto the server, computer device, or storage area network that the metadata database 240 resides on.

Figure 3:
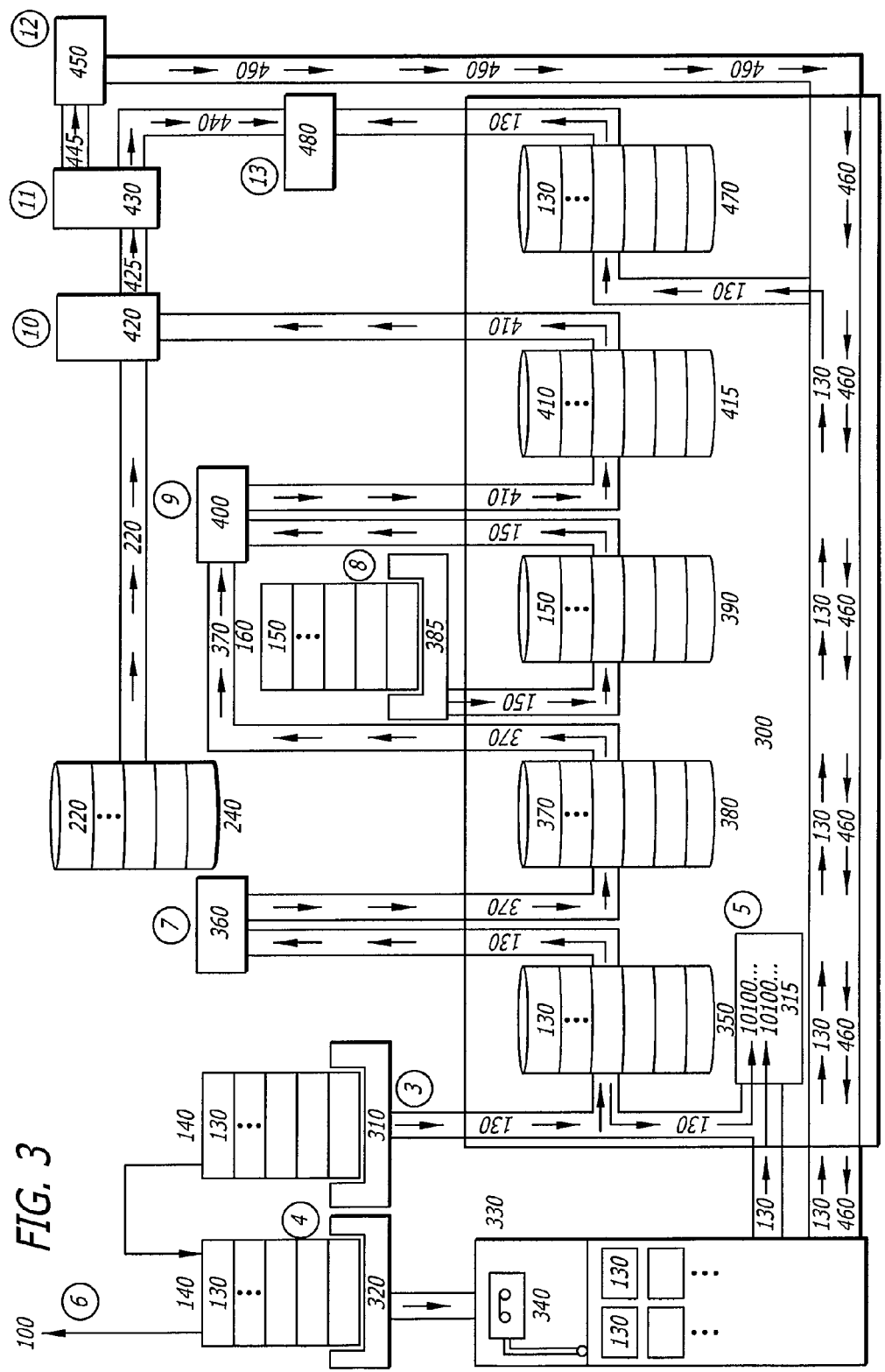
FIG. 3 illustrates a flow diagram for editing the recorded digital picture files and digital audio files according to another embodiment.

FIG. 3 illustrates the work flow of the editorial process of the digital picture files 130 and the digital audio files 150. Steps 3 through 13 of the disclosed system are depicted in FIG. 3. In Step 3, the portable file transport device 140, which has the digital picture files 130 loaded onto it, is connected to a file transfer port 310. After the portable file transport device 140 is connected to the file transfer port 310, the digital picture files 130 are copied to at least one database 350 on a storage area network 300.

In one embodiment, a F-Dock type docking station is utilized as the file transfer port 310. However, alternatively, other similar devices for transferring digital files can be used for the file transfer port 310. In another embodiment, a Xsan by Apple, Inc., is used for the storage area network 300. However, alternatively, other types of storage systems may be utilized for the storage area network 300 of the system. Examples of other types of storage systems that may be used for the storage area network 300 include, but are not limited to, a Network-attached Storage (NAS) system as well as any other type of computerized file-based storage system.

After the digital picture files 130 have been copied onto the storage area network 300, the portable file transport device 140 is disconnected from the file transfer port 310.

The portable file transport device 140 is then connected to the file transfer port 320, which is attached to data storage system 330. Once the portable file transport device 140 is connected to the file transfer port 320, during Step 4, the digital picture files 130 on the portable file transport device 140 are loaded onto a docking station cache on the file transfer port 320. The digital picture files 130 are then transferred from the docking station cache on the file transfer port 320 to at least one of the LTO-3 data storage cartridges 340 on the data storage system 330 with the use of a scalar robot.

In one embodiment, the file transfer port 320 is an A-Dock type docking station. Alternatively, other similar types of devices for transferring digital files can be utilized for the file transfer port 320. In another embodiment, data storage system 330 comprises an array of LTO-3 (Linear Tape-Open) data storage cartridges by IBM. However, alternatively, other types of storage mediums may be implemented in this system. Examples of other types of storage mediums include, but are not limited to, LTO-1, LTO-2, and LTO-4 data storage cartridges by IBM; AIT-1, AIT-2, AIT-3, AIT-4, AIT-5, and AIT-6 (Advanced Intelligent Tape) data storage by Sony; SAIT-1, SAIT-2, SAIT-3, and SAIT-4 (Super Advanced Intelligent Tape) data storage by Sony; DLT-1, DLT-2, DLT-3, and DLT-4 (Digital Linear Tape) data storage by DEC; SDLT (Super Digital Linear Tape) data storage by DEC and Quantum; CD-ROM discs; DVD-ROM discs; Bluray discs; DVD discs; and computer hard disk drives (HDD).

In another embodiment, the storage area network 300 and the data storage system 330 are physically located at two separate geographical locations. The storage area network 300 and the data storage system 330 are placed at two different locations to ensure that if one set of digital picture files 130 gets destroyed because of a disaster at one of the locations, a duplicate set of digital picture files 130 at the other location will be preserved.

In the next step, Step 5, the bits of the digital picture files 130 copied onto the storage area network 300 are compared to the bits of the corresponding digital picture files 130 loaded onto the data storage system 330. This comparison is done in order to verify that a substantial amount of bits of the digital picture files 130 are not missing or corrupt. In this step, the digital picture files 130 loaded on database 350 are loaded onto the bit comparison module 315 on the storage area network 300. And, the digital picture files 130 loaded on at least one LTO-3 data storage cartridge 340 on the data storage system 330 are loaded onto the bit comparison module 315 on the storage area network 300. Once both sets of digital picture files 130 are loaded onto the bit comparison module 315, the bit comparison module 315 compares the bits of the digital picture files 130 downloaded from database 350 to the bits of the corresponding digital picture files 130 downloaded from the data storage system 330.

If the bit comparison module 315 determines that the bits of the corresponding digital picture files 130 do not substantially match, the bit comparison module 315 will send an error message and/or flag to the editor user. Upon receiving the error message and/or flag, the editor user will then re-download the digital picture files 130 from the portable file transport device 140 to the data storage system 330.

In another embodiment, the error message and/or flag will be sent from the bit comparison module 315 to a reloading module. The reloading module communicates either by hard-line wire or wireless communications to the bit comparison module 315 and the portable file transport device 140. Upon receiving the error message and/or flag, the reloading module will send a command to the portable file transport device 140 to re-download the digital picture files 130 loaded onto it to the data storage system 330.

Once the digital picture files 130 have been downloaded again from the portable file transport device 140 to the data storage system 330, the digital picture files 130 are then loaded onto the bit comparison module 315 on the storage area network 300. The bit comparison module 315 will then compare the bits of the digital picture files 130 loaded from database 350 with the bits of the corresponding digital picture files 130 loaded from the data storage system 330.

If the bit comparison module 315 again determines that the bits of the corresponding digital pictures files 130 do not substantially match, the bit comparison module will send another error message and/or flag, and the above-described process will repeat until the bit comparison module 315 determines that the bits in the corresponding digital picture files 130 substantially match. If the bit comparison module 315 determines that the bits of the corresponding digital picture files 130 substantially match, the bit comparison module 315 reports that the bits substantially match, and the system will proceed to the next step, which is Step 6.

In another embodiment, the system includes a bit error threshold module. The bit error threshold module communicates either by hard-line wire or wireless communications to the bit comparison module 315. Alternatively, the bit error threshold module may be incorporated inside the bit comparison module 315. The bit error threshold module allows for a user to program a bit error rate threshold value. Once the user programs a bit error rate threshold value in the bit error threshold module, the bit error threshold module communicates that value to the bit comparison module 315.

If the bit comparison module 315 determines that the there are less bit errors than the bit error rate threshold value, then the bit comparison module 315 reports that the bits of the corresponding digital picture files 130 substantially match. Conversely, if the bit comparison module 315 determines that the there are more bit errors than the bit error rate threshold value, then the bit comparison module 315 reports that the bits of the corresponding digital picture files 130 do not substantially match by sending an error message and/or flag. Additionally, the bit comparison module 315 may be programmed by the user for cases where the bit error rate exactly meets the bit error threshold value to either report that the bits of the corresponding digital picture files 130 substantially match, or to report that the bits of the corresponding digital picture files 130 do not substantially match.

In an alternative embodiment, the total number of bits of the digital picture files 130 copied onto the storage area network 300 is compared to the total number of bits of the corresponding digital picture files 130 loaded onto the data storage system 330. This comparison is done in order to verify that a substantial amount of bits of the digital picture files 130 are not missing or corrupt. This verification of a total number of bits is commonly referred to as a checksum.

In this embodiment, the digital picture files 130 loaded on database 350 are loaded onto the bit comparison module 315 on the storage area network 300. And, the digital picture files 130 loaded on at least one LTO-3 data storage cartridge 340 on the data storage system 330 are loaded onto the bit comparison module 315 on the storage area network 300. Once both sets of digital picture files 130 are loaded onto the bit comparison module 315, the bit comparison module calculates the total number of bits of the digital picture files 130 downloaded from database 350 as well as the total number of bits of the corresponding digital picture files 130 downloaded from the data storage system 330. The bit comparison module 315, then, compares the two calculated total number of bits.

If the bit comparison module 315 determines that the total number of bits of the corresponding digital picture files 130 do not substantially match, the bit comparison module 315 will send an error message and/or flag to the editor user. Upon receiving the error message and/or flag, the editor user will then re-download the digital picture files 130 from the portable file transport device 140 to the data storage system 330.

Once the digital picture files 130 have been downloaded again from the portable file transport device 140 to the data storage system 330, the digital picture files 130 are then loaded onto the bit comparison module 315 on the storage area network 300. The bit comparison module 315 will then compare the total number of bits of the digital picture files 130 loaded from database 350 with the total number of bits of the corresponding digital picture files 130 loaded from the data storage system 330.

If the bit comparison module 315 again determines that the total number of bits of the corresponding digital pictures files 130 do not substantially match, the bit comparison module will send another error message and/or flag, and the above-described process will repeat until the bit comparison module 315 determines that the total number of bits in the corresponding digital picture files 130 substantially match. If the bit comparison module 315 determines that the total number of bits of the corresponding digital picture files 130 substantially match, the bit comparison module 315 reports that the total number of bits substantially match, and the system will proceed to the next step, which is Step 6.

During Step 6, all of the data loaded onto the portable file transfer device 140 is deleted, and the portable file transfer device 140 is transported back to the set 100 where the digital picture files and/or digital audio files are being recorded. Once the portable file transfer device 140 is physically at the location 100 of the filming, newly generated digital picture files 130 and/or digital audio files 150 can be loaded onto the device.

In Step 7, digital picture files 130 loaded on database 350 on the storage area network 300 are transferred to a conversion module 360. The conversion module 360 runs the digital picture files 130 through a conversion program. The conversion program converts the uncompressed digital picture files 130 to compressed digital picture files 370. After the uncompressed digital picture files 130 have been converted to compressed digital picture files 370, the compressed digital picture files 370 are then transferred to at least one database 380 on the storage area network 300.

In one embodiment, the conversion program used by the conversion module 360 is Shake by Apple, Inc. In this embodiment, the Shake program converts the uncompressed 4:4:4 full-range RGB DPX files 130 to DVCPRO HD media files 370. However, a different conversion program may alternatively be utilized by the system. Examples of other conversion programs that may be used by conversion module 360 include, but are not limited to, Compressor by Apple, Inc., QuickTime by Apple, Inc., Sorenson Squeeze by Sorenson Media, and Cleaner by Autodesk.

In another embodiment, the conversion module 360 may be implemented by a conversion hardware device. Conversion hardware devices that may be utilized include, but are not limited to, KONA capture cards by NA Video systems and Black Magic capture cards by Black Magic Design.

In yet another embodiment, the conversion program used to compress the uncompressed digital picture files 130, not only compresses the uncompressed digital picture files 130, but also applies a color correction factor to the uncompressed digital picture files 130. In this embodiment, the metadata 220 in the metadata database 240 supplies the color correction information for the corresponding uncompressed digital picture files 130 to the conversion module 360. The conversion module 360 then generates a color correction factor that is applied to the uncompressed digital picture files 130 during the conversion process.

During the next step, Step 8, the portable file transport device 160, which has the digital audio files 150 loaded onto it, is connected to a file transfer port 385. After the portable file transport device 160 is connected to the file transfer port 385, the digital audio files 150 are copied to at least one database 390 on a storage area network 300.

In Step 9, the compressed digital picture files 370 are transferred from the at least one database 380 to a synchronization module 400. And, similarly, the digital audio files 150 are transferred from the at least one database 390 to the synchronization module 400. Once the compressed digital picture files 370 and the digital audio files 150 have been loaded in the synchronization module 400, the compressed digital picture files 370 are combined and synchronized with their corresponding digital audio files 150. After the compressed digital picture files 370 have been combined and synchronized with their corresponding digital audio files 150, the resulting compressed digital picture files with corresponding digital audio files 410 are then transferred to at least one database 415 on the storage area network 300.

In an alternative embodiment, the compressed digital picture files 370 are automatically combined and synchronized with their corresponding digital audio files 150 in the conversion module 360, not the synchronization module 400. Thus, there is no synchronization module 400 in this embodiment. In this embodiment, the metadata 220 in the metadata database 240 supplies the synchronization information for the compressed digital picture files 370 to the conversion module 360. During the conversion process, the conversion module 360 automatically synchronizes and combines the compressed digital picture files 370 with their corresponding digital audio files 150.

In another embodiment, users are able to access and view the resulting compressed digital picture files with corresponding digital audio files 410 by accessing the metadata database 240. In this embodiment, the users may access the metadata database 240 by either logging onto a film editing portal website or by directly logging onto the server, computer device, or storage area network that the metadata database 240 resides on.

In another embodiment, the resulting compressed digital picture files with corresponding digital audio files 410 may converted to further compressed files for review of users. Examples of video file container formats that may be used for the further compressed files in this embodiment include, but are not limited to, DVD (Digital Video Disc), HD-DVD (High Definition Digital Video Disc), Bluray, Quicktime, Flash video, and WMV (Windows Media Video). In addition, various encoding schemes may be used for the further compressed files. Types of encoding schemes that may be used include, but are not limited to, MPEG1, MPEG2, MPEG4, H.264, and Sorenson 3. In yet another embodiment, users may view and display the further compressed files by accessing the metadata database 240 by either logging onto a film editing portal website or by directly logging onto the server, computer device, or storage area network that the metadata database 240 resides on.

During the next step, Step 10, the compressed digital picture files with corresponding digital audio files 410 are organized with the metadata 220. In this step, the metadata 220 is transferred from the metadata database 240 to the organization module 420. The compressed digital picture files with corresponding digital audio files 410 are transferred from the at least one database 415 to the organization module 420. Once the metadata 220 and the compressed digital picture files with corresponding digital audio files 410 are loaded in the organization module 420, the organization module 420 organizes the compressed digital picture files with corresponding digital audio files 410 with the metadata 220 to generate compressed digital picture files with corresponding digital audio files and metadata 425.

In Step 11, the compressed digital picture files with corresponding digital audio files and metadata 425 are edited in the editing module 430. In this step, the compressed digital picture files with corresponding digital audio files and metadata 425 are transferred from the organization module 420 to the editing module 430. Once the compressed digital picture files with corresponding digital audio files and metadata 425 are loaded in the editing module 430, the compressed digital picture files with corresponding digital audio files and metadata 425 are cut and organized. According to how the compressed digital picture files with corresponding digital audio files and metadata 425 are cut and organized, the editing module 430 generates at least one editing decision list document 445 and editing instructions 440.

In one embodiment, the editing function in the editing module 430 is accomplished by the use of Final Cut Pro software by Apple, Inc. However, alternatively, other editing programs and/or scripts may be used for the editing process in the editing module 430. For example, other editing programs that may be used for the editing process in the editing module 430 include, but are not limited to, AVID editing software by AVID Technology, Inc. and Adobe Premiere software by Adobe Systems, Inc.

During Step 12, the at least one editing decision list document 445 is converted to retrieval instructions 460, which are used to retrieve specific digital picture files 130 from the data storage system 330. In this step, at least one editing decision list document 445 is exported from the editing module 430 to the retrieval module 450. Once the editing decision list document 445 is loaded onto the retrieval module 450, the retrieval module 450 converts the editing decision list document 445 to retrieval instructions 460. The retrieval instructions 460 contain instructions for the data storage system 330 to send specific digital picture files 130 to the storage area network 300.

The retrieval module 450 sends at least one retrieval instruction 460 to the data storage system 330. In response, the data storage system 330, sends the specified digital picture files to the storage area network 300. Once the retrieved digital picture files 130 are sent to the storage area network 300, the retrieved digital picture files 130 are loaded onto at least one database 470 on the storage area network 300. In one embodiment, the retrieval document 445 is a XML (Extensible Markup Language) document. Alternatively, the retrieval document can be created in another data format.

In the next step, Step 13, the retrieved digital picture files 130 and their corresponding digital audio files 150 are conformed. In this step, the retrieved digital picture files 130 are transferred from the at least one database 470 to a conforming module 480. In addition, the editing module 430 exports editing instructions 440 to the conforming module 480. Also, digital audio files 150 that correspond to the retrieved digital picture files 130 are transferred to the conforming module 480. These digital audio files 150 are either exported from the at least one database 390 on the storage area network 300 to the conforming module 480, or exported from editing module 430 to the conforming module 480. (not shown in FIG. 3) Once the retrieved digital picture files 130 and their corresponding digital audio files 150 are loaded in the conforming module 480, the retrieved digital picture files 130 and the digital audio files 150 are conformed according to the editing instructions 440 to produce the final version of the film.

In an alternative embodiment, prior to the execution of Step 3, the at least one portable file transport device 140 containing the digital picture files 130 is transported to an editing company. Once the portable file transport device 140 arrives at the editing company, the editing company downloads the digital picture files 130 from the portable file transport device 140 onto their editing system. After the digital picture files 130 are downloaded onto their editing system, the editing company edits the digital picture files 130 and/or adds special effects to the digital picture files 130. Once the editing company is finished altering the digital picture files 130, the altered digital picture files 130 are reloaded onto the portable file transport device 140. The portable file transport device 140 is then transported to the location of file transfer port 310. Once the portable file transport device 140 arrives to the location of file transfer port 310, Step 3 may commence.

In another embodiment, the digital picture files 130 are not generated by a digital film recorder 110. In this embodiment, a series of picture images are photographed onto strips of negative film. The images on the strips of negative film are then converted into digital pictures files 130 by various methods. The methods of conversion include, but are not limited to, the images on the strips of negative film being scanned by an image scanner device to generate the digital picture files 130.

In an alternative embodiment, the digital picture files 130 are not generated by a digital film recorder 110, but rather are animation files. These animation files may be created by various means. For example, means of creation of the animation files include, but are not limited to, the animation files being hand-drawn or computer generated. In this embodiment, the animation files are converted into digital picture files 130.

In another alternative embodiment, Digital HD (High Definition) video tape may be used to generate the picture images as well as the audio. This video tape can then be converted to digital picture files 130 to be used by the system. Examples of formats of Digital HD video tape that may be used for this embodiment include, but are not limited to, HDCAM by Sony, SR HDCAM by Sony, D5-HD by Panasonic, DVCPro-HD by Panasonic, and AVCHD by Sony and Panasonic.

Although certain illustrative embodiments, methods, and steps have been disclosed herein, it can be apparent from the foregoing disclosure to those skilled in the art that variations and modifications of such embodiments, methods, and steps can be made without departing from the true spirit and scope of the art disclosed. In particular, the steps may be executed in alternative sequences than the disclosed sequence of steps. Also, some of the steps disclosed may be omitted.

In addition, the transfer of the digital files throughout the disclosed system may be accomplished by various means of electrical communications, including, but not limited to, high speed Internet connections, electrical wire connections, optical fiber connections, and wireless radio frequency (RF) communications. Also, the modules and/or databases in the disclosed system may be combined, or conversely divided, into one or more electrical devices and/or sub-devices.

Alternatively, the modules and/or databases in the disclosed system may all reside on a single computer server device or may be divided amongst a number of computer server devices. Many other examples of the art disclosed exist, each differing from others in matters of detail only. Accordingly, it is intended that the art disclosed shall be limited only to the extent required by the appended claims and the rules and principles of applicable law.

We claim:

1. A method of editing digital motion picture computer files and digital audio computer files comprising:
    recording the digital motion picture files and the digital audio files, the digital motion picture files being recorded and stored at a location of a film shoot to thereby obtain recorded digital picture files;
    loading the recorded digital motion picture files and the digital audio files onto at least one portable file transport device;
    uploading metadata from the digital motion picture files to a metadata database;
    copying the recorded digital motion picture files from the at least one portable file transport device to a storage area network;
    verifying the accuracy of the copying by effecting a bit error comparison one or more times until that bit errors do not exceed a bit error rate threshold to obtain verified recorded digital motion picture files;
    converting the verified recorded digital motion picture files copied onto the storage area network to recorded digital motion picture files;
    loading the digital audio files from the at least one portable file transport device to the storage area network;
    combining and synchronizing the recorded digital motion picture files with the digital audio files loaded onto the storage area network to generate recorded digital motion picture files with corresponding digital audio files;
    organizing the recorded digital motion picture files with corresponding digital audio files with the metadata loaded onto the metadata database to generate recorded digital motion picture files with corresponding digital audio files and metadata;
    editing files according to how the recorded digital motion picture files and audio files and the metadata are organized by cutting and organizing the recorded digital motion picture files with corresponding digital audio files and metadata to generate at least one editing decision list document and editing instructions;
    converting the at least one editing decision list document to retrieval instructions;
    retrieving the recorded digital motion picture files according to the retrieval instructions; and conforming the retrieved recorded digital motion picture files and the digital audio files according to the editing instructions, and according to the recorded digital motion picture files, and wherein during each of the film editing, loading, copying, converting, synchronizing and organizing steps, the recorded digital motion picture files are maintained and employed to obtain conformed digital motion picture files according to the recorded digital motion picture files, and wherein the digital motion picture files are selected from the group consisting of: 4:4:4 full-range RGB DPX (digital motion picture exchange) files, DPX (digital motion picture exchange) files, and OpenEXR File Format.

2. The method of claim 1 further comprising:
    allowing at least one user to load notes, instructions, and/or additional metadata onto the metadata database.

3. The method of claim 1 further comprising:
    allowing at least one user to access the metadata on the metadata database.

4. The method of claim 1 further comprising:
    allowing at least one user to access and view the recorded digital motion picture files with corresponding digital audio files by accessing the metadata database.

5. The method of claim 1 further comprising:
    allowing at least one user to access and view the recorded digital motion picture files with corresponding digital audio files and metadata by accessing the metadata database.

6. The method of claim 1 further comprising:
    loading the recorded digital motion picture files from the at least one portable file transport device to a data storage system, and comparing bits of the recorded digital motion picture files copied onto the storage area network with bits of the recorded digital motion picture files loaded onto the data storage system.

7. The method of claim 6 wherein if the bits of the recorded digital motion picture files copied onto the storage area network substantially match with the bits of the recorded digital motion picture files loaded onto the data storage system, the recorded digital motion picture files loaded on the at least one portable file transport device are deleted.

8. The method of claim 6 wherein if the bits of the recorded digital motion picture files copied onto the storage area network do not substantially match with the bits of the recorded digital motion picture files loaded onto the data storage system; (a) an error message and/or flag is sent; (b) the recorded digital motion picture files from the at least one portable file transport device are loaded onto the data storage system; (c) the bits of the recorded digital picture files copied onto the storage area network are compared with the bits of the recorded motion digital picture files loaded onto the data storage system; and if the bits of the recorded digital motion picture files copied onto the storage area network do not substantially match with the bits of the recorded digital motion picture files loaded onto the data storage system, (a), (b), and (c) are repeated one or more times in an iterative manner.

9. An apparatus of editing digital motion picture computer files and digital audio computer files comprising:
    a processor;
    a memory;
    at least one digital motion film recorder to record the digital motion picture files and the digital audio files, the digital motion picture files being recorded and stored at a location of a film shoot to thereby obtain recorded digital motion picture files;
    at least one portable file transport device to store the recorded digital motion picture files and the digital audio files;
    a metadata database, stored in the memory that when executed by the processor uploads metadata from the recorded digital motion picture files;
    a storage area network to copy the recorded digital motion picture files from the at least one portable file transport device to the storage area network;

a verification protocol, stored in the memory that when executed by the processor determines the accuracy of the copying by effecting a bit error comparison one or more times until bit errors do not exceed a bit error rate threshold to obtain verified recorded digital motion picture files;

a conversion module, stored in the memory that when executed by the processor converts the verified recorded digital motion picture files copied onto the storage area network to recorded digital motion picture files;

a synchronization module, stored in the memory that when executed by the processor combines and synchronizes the recorded digital motion picture files with the digital audio files to generate recorded digital motion picture files with corresponding digital audio files;

an organization module, stored in the memory that when executed by the processor organizes the recorded digital motion picture files with corresponding digital audio files with the metadata loaded onto the metadata database to generate recorded digital motion picture files with corresponding digital audio files and metadata;

an editing module, stored in the memory that when executed by the processor edits files according to how the recorded digital motion picture files and audio files and the metadata are organized and cuts and organizes the recorded digital motion picture files with corresponding digital audio files and metadata to generate at least one editing decision list document and editing instructions;

a retrieval module, stored in the memory that when executed by the processor converts the at least one editing decision list document to retrieval instructions and retrieves the recorded digital motion picture files according to the retrieval instructions; and a conforming module, stored in the memory that when executed by the processor confirms the retrieved recorded digital motion picture files and the digital audio files according to the editing instructions and according to the recorded digital motion picture files, and wherein during execution of the conversion module, synchronizing module, organization module, editing module, retrieval module and confirmation module, the recorded digital motion picture files are maintained and employed to obtain conformed digital motion picture files according to the recorded digital motion picture files, and wherein the digital motion picture files are selected from the group consisting of: 4:4:4 full-range RGB DPX (digital motion picture exchange) files, DPX (digital motion picture exchange) files, and OpenEXR File Format.

10. The apparatus of claim 9 wherein the metadata database, stored in the memory that when executed by the processor allows at least one user to load notes, instructions, and/or additional metadata onto the metadata database.

11. The apparatus of claim 9 wherein the metadata database, stored in the memory that when executed by the processor allows at least one user to access the metadata on the metadata database.

12. The apparatus of claim 9 wherein the metadata database, stored in the memory that when executed by the processor allows at least one user to access and view the recorded digital motion picture files with corresponding digital audio files by accessing the metadata database.

13. The apparatus of claim 9 wherein the metadata database, stored in the memory that when executed by the processor allows at least one user to access and view the recorded digital motion picture files with corresponding digital audio files and metadata by accessing the metadata database.

14. The apparatus of claim 9 further comprising: a data storage system to store the recorded digital motion picture files from the at least one portable file transport device, and a bit comparison module to compare bits of the recorded digital motion picture files copied onto the storage area network with bits of the recorded digital motion picture files loaded onto the data storage system.

15. The apparatus of claim 14 wherein if the bits of the recorded digital motion picture files copied onto the storage area network substantially match with the bits of the recorded digital motion picture files loaded onto the data storage system, the recorded digital motion picture files loaded on the at least one portable file transport device are deleted.

16. The apparatus of claim 14 wherein if the bit comparison module determines that the bits of the recorded digital motion picture files copied onto the storage area network do not substantially match with the bits of the recorded digital motion picture files loaded onto the data storage system; (a) the bit comparison module sends an error message and/or flag; (b) the recorded digital motion picture files from the at least one portable file transport device are loaded onto the data storage system; (c) the bit comparison module compares the bits of the recorded digital motion picture files copied onto the storage area network with the bits of the recorded digital motion picture files loaded onto the data storage system; and if the bit comparison module determines that the bits of the recorded digital motion picture files copied onto the storage area network do not substantially match with the bits of the recorded digital motion picture files loaded onto the data storage system, (a), (b), and (c) are repeated one or more times in an iterative manner.

* * * * *